W. H. KEMPTON.
FLASH MOLD.
APPLICATION FILED SEPT. 10, 1917.

1,333,621.

Patented Mar. 16, 1920.

WITNESSES:
Felix C. Rodgers
E. V. Griggs

INVENTOR
Willard H. Kempton
BY
Wesley G. Carr
ATTORNEY

UNITED STATES PATENT OFFICE.

WILLARD H. KEMPTON, OF WILKINSBURG, PENNSYLVANIA, ASSIGNOR TO WESTINGHOUSE ELECTRIC AND MANUFACTURING COMPANY, A CORPORATION OF PENNSYLVANIA.

FLASH-MOLD.

1,333,621.

Specification of Letters Patent. Patented Mar. 16, 1920.

Application filed September 10, 1917. Serial No. 190,509.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Flash-Molds, of which the following is a specification.

My invention relates to molding apparatus and particularly to molds of the class termed "flash molds," and it has for an object to provide molding apparatus which will permit the escape of excess molding material while insuring that the molded parts are properly formed and completely filled out.

A further object of my invention is to provide molds in which the molded material is subjected to a certain pressure during molding in order to prevent flaws and holes.

Figure 1:
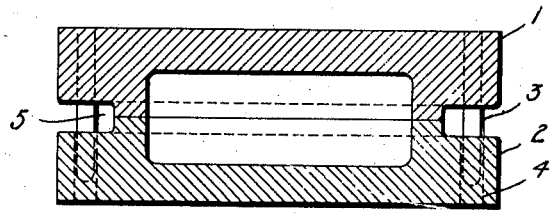
Figure 2:
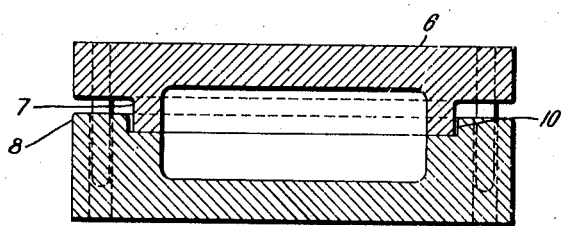
Figure 3:
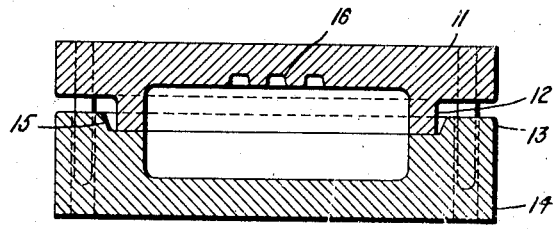

In the drawing, Figure 1 is a cross section of the ordinary type of flash mold; Fig. 2 is a cross section of one form of my improved mold; and Fig. 3 is a cross section of a modified form of my invention.

The term "flash mold," as used herein, applies to that class of molds in which an excess of molding material is placed in the mold and the excess amount is either forced out or permitted to escape between the two halves of the mold during the molding operation.

In Fig. 1 is shown the ordinary two-part flash mold consisting of upper or cope member 1 and lower or drag member 2 which are kept in vertical alinement by pins 3 connected to the upper member 1 and fitting loosely into corresponding apertures 4 in the lower member 2. In molding or forming an object by means of this type of mold, an excess of the molten or plastic material to be molded is placed in the lower member and the excess escapes between the two members, as at 5 in Fig. 1, when the cope member is brought down upon the drag member.

My improved form of mold is shown in Fig. 2, in which cope member 6 has a downwardly extending flange 7 fitting within an upwardly extending flange 8 on drag member 9. A clearance space 10 is provided between the flanges 7 and 8 through which the excess material escapes. During the molding operation, excess material flows out without opposition, as cope member 6 is lowered until the lower margin of flange 7 passes the upper margin of flange 8. From this point, there is an increasing back pressure, due to the head of material in recess 10, as flange 7 travels downwardly, and this back pressure tends to resist the escape of material. This is very important in that it causes the material being molded to properly fill such portions of the mold as are most remote from the points where excess material escapes.

In the modification of Fig. 3, a cope member 11 has a downwardly-extending flange 12 fitting within upwardly-extending flange 13 on drag member 14. Flange 13 has a downwardly-inclined inner wall 15. The cope member is provided with recesses corresponding to desired projections on the molded objects, as indicated at 16. In this form of the invention, the material encounters a back pressure in the same manner as was described in connection with the apparatus of Fig. 2. At the instant that the lower margin of upper flange 12 passes the upper margin or flange 13 the excess material is escaping by passing beneath flange 12 and up between flanges 12 and 13 and the smallest area of its passageway occurs at the line extending directly from the lower outer margin of flange 12 to inclined wall 15. As flange 12 continues in its travel downwardly, it approaches flange 13 and the area of its passageway or the clearance, progressively decreases. This decrease in the clearance causes an increasing resistance to the flow of the current of escaping excess material. This effect is in addition to the back pressure previously described and insures that the recesses 16 will be properly filled out.

Obviously, many modifications in these constructions may be made by those skilled in the art without departing from the spirit of my invention.

I claim as my invention:

1. A mold comprising two coöperating portions having overlapping flanges arranged to permit excess molding material to escape therebetween, the flange of the lower portion being spaced about that of the upper portion.

2. A flash mold having a cope member and a drag member, said drag member having an upstanding flange externally overlapping a portion of said cope member and spaced therefrom.

3. A flash mold comprising a cope member and a drag member having co-acting means, in addition to the diminishing space between their meeting edges, to produce a back pressure tending to prevent the escape of excess molding material from the mold.

4. A mold comprising coöperating cope and drag members having co-acting means to permit the escape of excess molding material from the mold during the molding operation, while causing an increasing resistance to such escape in addition to that caused by the diminishing space between their meeting edges.

5. A flash mold comprising a drag member having an upwardly-extending flange provided with an inclined inner wall and a cope member having a downwardly-extending flange fitting within the aforesaid flange so as to leave a clearance space between said flanges.

6. A flash mold comprising a drag member having an upwardly extending flange about its edge and a cope member having a downwardly extending flange engaging the upper edge of the drag member and spaced apart from and within the flange of the drag member.

7. A flash mold comprising relatively movable cope and drag members and coöperating means carried by the meeting portions of the members for maintaining a head of the material being molded during the latter part of the relative movement of the members to exert a back pressure upon the material in the mold.

In testimony whereof, I have hereunto subscribed my name this 23rd day of August, 1917.

WILLARD H. KEMPTON.